US012558907B2

(12) United States Patent
Miyashita et al.

(10) Patent No.: US 12,558,907 B2
(45) Date of Patent: Feb. 24, 2026

(54) PRINT HEAD, HEAD CARTRIDGE, AND PRINTING APPARATUS

(71) Applicant: CANON KABUSHIKI KAISHA, Tokyo (JP)

(72) Inventors: Takeho Miyashita, Kanagawa (JP); Kyosuke Toda, Kanagawa (JP); Yasuaki Kitayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 18/234,020

(22) Filed: Aug. 15, 2023

(65) Prior Publication Data

US 2024/0059084 A1 Feb. 22, 2024

(30) Foreign Application Priority Data

Aug. 16, 2022 (JP) ................................ 2022-129594

(51) Int. Cl.
*B41J 2/14* (2006.01)
*B41J 25/34* (2006.01)

(52) U.S. Cl.
CPC .................................... *B41J 25/34* (2013.01)

(58) Field of Classification Search
CPC ............ B41J 2/14; B41J 25/34; B41J 2/1433
See application file for complete search history.

(56) References Cited

U.S. PATENT DOCUMENTS

| | | | | |
|---|---|---|---|---|
| 10,112,387 | B2 | 10/2018 | Moriya et al. | |
| 10,889,112 | B2 | 1/2021 | Kubo et al. | |
| 2002/0097299 | A1* | 7/2002 | Terui | B41J 2/14072 347/50 |
| 2013/0187986 | A1* | 7/2013 | Koseki | B41J 2/145 438/21 |

FOREIGN PATENT DOCUMENTS

| | | | |
|---|---|---|---|
| JP | 2017-124607 | A | 2/2017 |
| JP | 2018-012305 | A | 1/2018 |
| JP | 2019-73000 | A | 5/2019 |
| JP | 2019-142052 | A | 8/2019 |

* cited by examiner

*Primary Examiner* — Jason S Uhlenhake
(74) *Attorney, Agent, or Firm* — Venable LLP

(57) ABSTRACT

In a downsized print head, in which a plurality of print element substrates are arranged in parallel in a serial type printing apparatus, a first print element substrate, in which a terminal row and an ejection element row are arranged, and a second print element substrate, in which a terminal row and an ejection element row are arranged, are arranged in parallel. The first print element substrate and the second print element substrate are arranged so that each terminal row is located outside in a first direction and each ejection element row is located inside in the first direction.

12 Claims, 14 Drawing Sheets

PRINT HEAD, HEAD CARTRIDGE, AND PRINTING APPARATUS

BACKGROUND

Field of the Disclosure

The present disclosure relates to a print head, a head cartridge, and a printing apparatus.

Description of the Related Art

In recent years, there has been a demand for ejecting a wide variety of liquids from a print head of a printing apparatus. In a print head in a common serial type printing apparatus, there is a case where ejection of various liquids is implemented by arranging a plurality of print element substrates and ejecting a different liquid for each ejection port row in a plurality of ejection port rows formed in each print element substrate.

Japanese Patent Laid-Open No. 2019-73000 discloses a print head in which a plurality of print element substrates having an ejection port row and an electric connection portion for receiving power to be supplied to the ejection port row are arrayed in a direction intersecting the ejection port row (see FIGS. 12, 13A, and 13B). In the configuration disclosed in Japanese Patent Laid-Open No. 2019-73000, an electric connection portion 542 of a print head 500 is arranged at a front edge and a rear edge of ejection port rows 5411 to 5413. Further, a plurality of print element substrates 540 (540_a_ to 540_g_) are arranged in parallel in a direction (i.e., an X direction) intersecting a direction (i.e., a Y direction) in which the ejection port rows 5411 to 5413 extend.

In recent years, as shown in FIG. 14, in order to downsize the print head, there is the case of arraying a plurality of ejection port rows (6411 to 6414) in one print element substrate 640 and arraying, in parallel in the ejection port rows, a plurality of terminals 6421 for supplying the ejection port rows with power.

However, arranging a plurality of print element substrates as shown in FIG. 14 in parallel in one serial type print head in order to increase the number of ink colors causes wiring connected to an electric connection portion 642 to exist between a plurality of ejection port rows, resulting in upsizing of the print head.

Thus, the object of the present disclosure is to provide a downsized print head in which a plurality of print element substrates are arranged in parallel in a serial type printing apparatus.

SUMMARY

In order to achieve the object, a print head mountable in a printing apparatus for printing an image on a print medium by repeating a print scanning which is performed by moving in a first direction with the print medium while ejecting ink and a conveyance operation of conveying the print medium in a second direction intersecting the first direction, the print head comprising: a first print element substrate and a second print element substrate, each having an ejection element row and a terminal row arranged in parallel in the first direction, wherein the ejection element row is formed by arraying in the second direction a plurality of ejection elements capable of ejecting ink in accordance with an ejection signal and the terminal row is formed by arraying in the second direction a plurality of terminals for receiving the ejection signal in a state in which the print head is mounted; and a connection substrate electrically connected to a terminal row in the first print element substrate and a terminal row in the second print element substrate, wherein the first print element substrate and the second print element substrate are arranged in the first direction so that each terminal row is located outer side of the first and the second print element substrate and each ejection element row is located inner side of the first and the second print element substrate.

Further features of the present disclosure will become apparent from the following description of exemplary embodiments with reference to the attached drawings.

DESCRIPTION OF THE EMBODIMENTS

First Embodiment

[Coordinate Axes]

First, a description will be given of coordinate axes used in each figure. In the following description, for the coordinate axes in the figures, a direction in which a plurality of print element substrates shown in FIG. 2B are arranged in parallel will be referred to as an X direction. The X direction corresponds to a direction in which a print head scans in a state where the print head is mounted in a printing apparatus. A direction orthogonal to the direction in which a plurality of print element substrates are arranged in parallel on a plane will be referred to as a Y direction. Incidentally, in a state where the print head is mounted in the printing apparatus, a direction in which a print medium (not shown) is conveyed is a +Y direction, and a direction opposite to the +Y direction is a −Y direction. A left direction when viewed facing in the +Y direction is a +X direction, and a direction opposite to the +X direction is a −X direction. An anti-gravity direction will be referred to as a +Z direction, and a gravity direction will be referred to as a −Z direction.

A surface facing in ±X direction in a first print head 100 (see FIG. 2A) will be referred to as the side surface of the print head. A surface facing in the +Y direction in the print head will be referred to as the front surface of the print head. Conversely, a surface facing in the −Y direction in the print head will be referred to as the back surface of the print head. On the other hand, a surface facing in the +Z direction in the print head will be referred to as the upper surface of the print head. Conversely, a surface facing in the −Z direction in the print head will be referred to as the bottom surface of the print head. The above is the description of the coordinate axes.

[Printing Apparatus 10]

Figure 1:
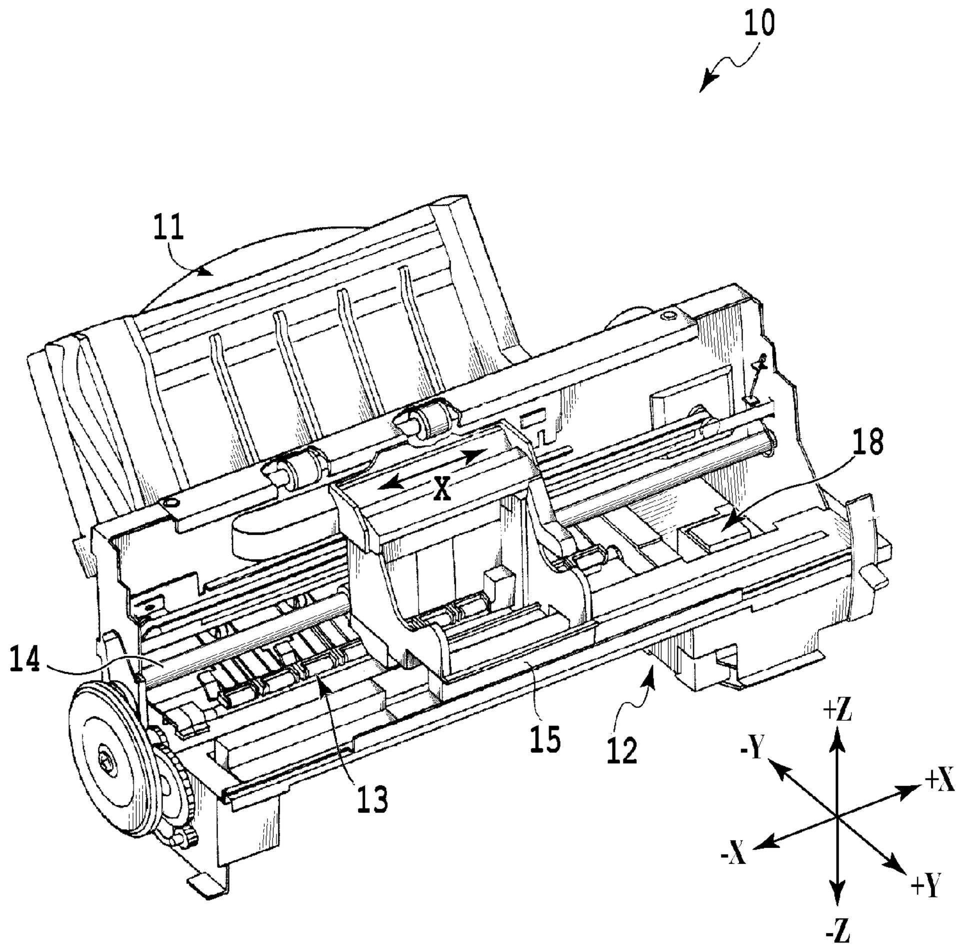
FIG. 1 is a perspective view showing a schematic configuration of a printing apparatus according to one embodiment.

FIG. 1 is a perspective view showing a schematic configuration of a printing apparatus 10 according to a first embodiment.

As shown in FIG. 1, the printing apparatus 10 includes an automatic feeding unit 11, a discharging unit 12, a conveying unit 13, a carriage shaft 14, a carriage 15, a collecting unit 18, and the like.

The automatic feeding unit 11 automatically feeds a sheet-like print medium such as paper into an apparatus body. The conveying unit 13 guides the print medium sent out one by one from the automatic feeding unit 11 to a predetermined printing position and intermittently conveys the print medium from the printing position to the discharging unit 12. The collecting unit 18 performs collecting processing for collecting the liquid ejection performance of the first print head 100 (see FIG. 2A) mounted on the carriage 15 and ejecting liquid onto the print medium conveyed to the printing position to perform printing. The first print head 100 performs printing by ejecting ink onto a print medium while moving in a print scanning direction. The conveying unit 13 then conveys a predetermined amount of print media, and the first print head 100 performs printing of the print medium while performing print scanning again. In this manner, the printing apparatus 10 prints an image on a print medium by repeating the print scanning of the first print head 100 that moves in a first direction with respect to a print medium while ejecting ink and the conveyance operation of conveying the print medium in a second direction intersecting the first direction. That is, the printing apparatus 10 according to the present embodiment is a so-called serial type printing apparatus.

[First Print Head 100]

Figure 2A:
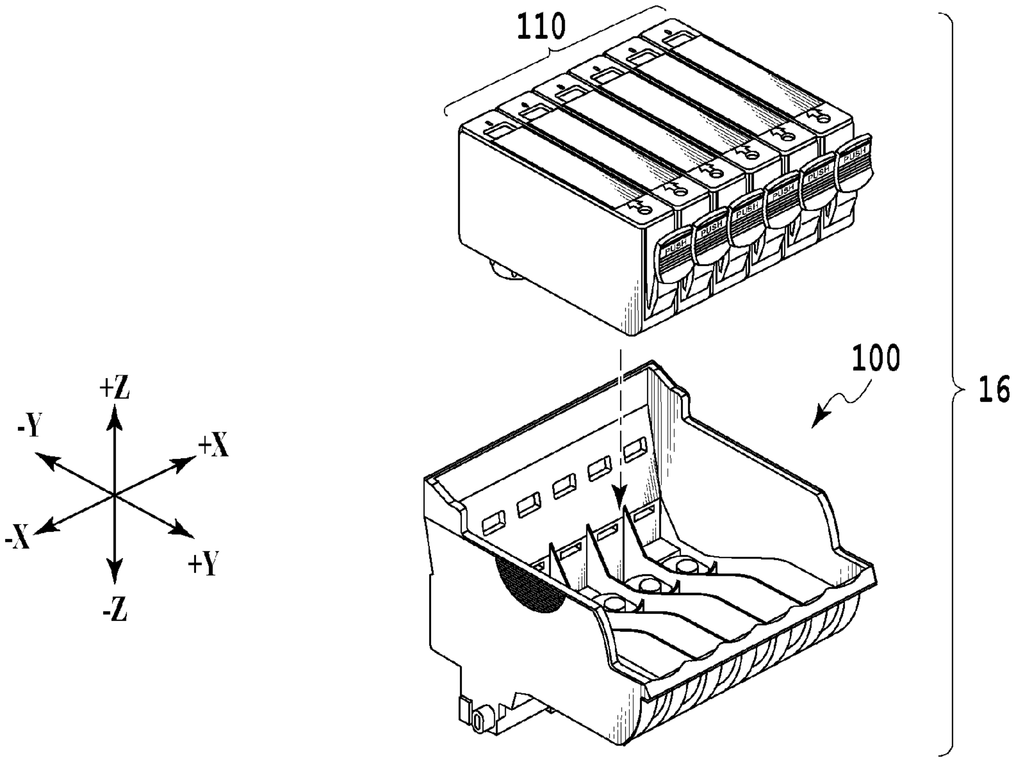
FIGS. 2A and 2B are diagrams showing an example of a print head applicable to the printing apparatus according to one embodiment.
Figure 2B:
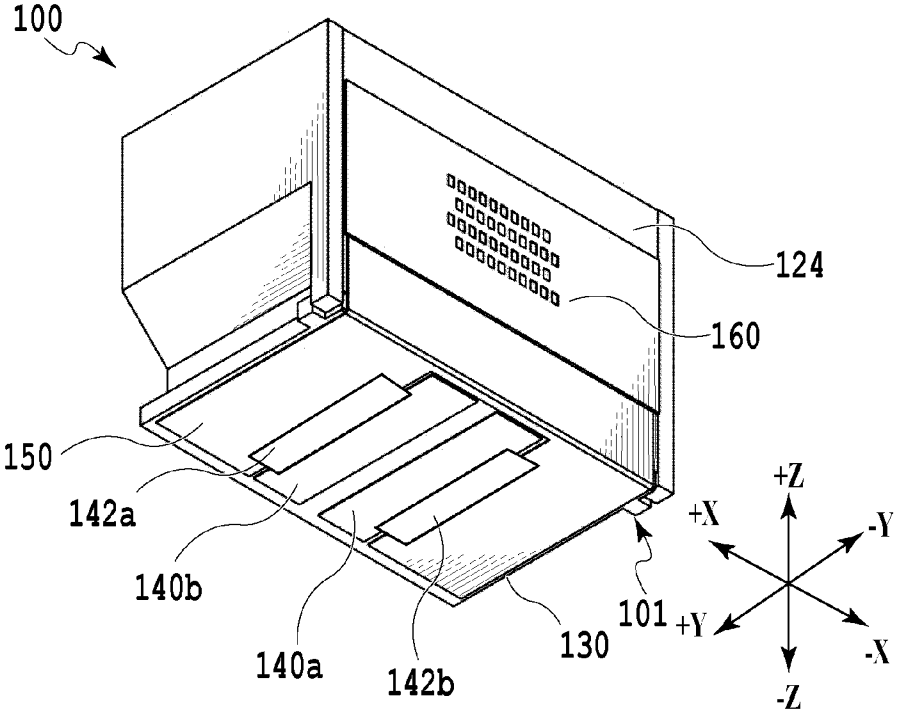

FIGS. 2A and 2B are diagrams showing an example of the first print head 100 applicable to the printing apparatus according to the present embodiment. FIG. 2A is a perspective view of a head cartridge 16 as viewed from above according to the present embodiment. FIG. 2B is a perspective view of the print head as viewed from a bottom surface side according to the present embodiment.

As shown in FIG. 2A, the head cartridge 16 includes an ink tank 110 that stores ink and the first print head 100 that ejects ink supplied from the ink tank 110.

The first print head 100 is mountable in the printing apparatus 10 (see FIG. 1) for printing an image on a print medium. The ink tanks 110 for black, light cyan, light magenta, cyan, magenta, and yellow are detachably mounted in the first print head 100.

Each ink tank 110 contains ink of each color to be supplied to a first print element substrate 140*a* (see FIG. 2B) and a second print element substrate 140*b* (see FIG. 2B). In the first print element substrate 140*a* and the second print element substrate 140*b*, ejection elements capable of ejecting ink are arranged.

The first print head 100 is detachably mounted on the carriage 15 shown in FIG. 1. The first print head 100 is an inkjet print head ejecting ink using thermal energy and includes an electrothermal converter for generating thermal energy. That is, the first print head 100 boils the ink with the thermal energy generated by the electrothermal converter and uses the blowing energy to eject liquid from an ejection port to a print medium. Incidentally, the first print head 100 may also use a piezo element or the like in addition to the electrothermal converter as a liquid ejection energy generating element.

As shown in FIG. 2B, the first print head 100 includes a support member 130 and a first print element substrate unit 101. The first print element substrate unit 101 includes a connection substrate 150 electrically connected to the first print element substrate 140*a* and the second print element substrate 140*b*. Further, the first print element substrate unit 101 includes an electric substrate 160 that is electrically connected to the connection substrate 150 and receives an electric signal sent from the printing apparatus body. Hereinafter, each of the first print element substrate 140*a* and the second print element substrate 140*b* will be referred to as a print element substrate 140 in a case where there is no particular need to distinguish between the first print element substrate 140*a* and the second print element substrate 140*b*.

The support member 130, which is a support portion that supports the print element substrate 140, is bonded to the bottom surface portion of the first print head 100. Examples of a technique or method for bonding the bottom surface portion and the support member 130 of the first print head 100 include adhesion using an adhesive. As another example, there is an example in which a seal member is sandwiched between the bottom surface portion and the support member 130 of the first print head 100 and fixed by screwing. In the present embodiment, the connection substrate 150, the first print element substrate 140*a*, and the second print element substrate 140*b* are bonded to the support member 130. Examples of a means for bonding the print element substrate 140 to the support member 130 include adhesion using an adhesive.

The support member 130 includes a channel formed to supply liquid supplied from the ink tank 110 to the print element substrate 140. That is, with the support member 130 and the print element substrate 140 bonded to each other, there is formed a channel through which each ink tank 110 and the print element substrate 140 communicate with each other. The liquid supplied to the print element substrate 140 is ejected from the ejection port formed in the print element substrate 140 in accordance with an ejection signal received from an electric substrate 160, which will be described later.

On the back surface portion of the first print head 100, there is formed a contact surface 124 electrically connectable to a contact pad (not shown) of the carriage 15 in the case of mounting the first print head 100 on the carriage 15. The electric substrate 160 configured to receive an electric signal sent from the body of the printing apparatus 10 is arranged on the contact surface 124. Examples of a technique for arranging the electric substrate 160 on the contact surface 124 include caulking, fixing with an adhesive, fixing with a two-sided adhesive tape, or the like. The electric substrate 160 and the connection substrate 150 are electrically connected to each other. The electric substrate 160 and the connection substrate 150 may be connected by wire bonding or anisotropic-conductive-film (ACF) pressure bonding. Further, the connection substrate 150 and the print element substrate 140 are electrically connected. The connection substrate 150 and the print element substrate 140 may be connected by wire bonding or by flying lead bonding. As a result, in a case where an electric signal is sent from the print apparatus body to the electric substrate 160, the electric signal is sent to the print element substrate 140 via the connection substrate 150.

[First Print Element Substrate Unit 101]

Figure 3:
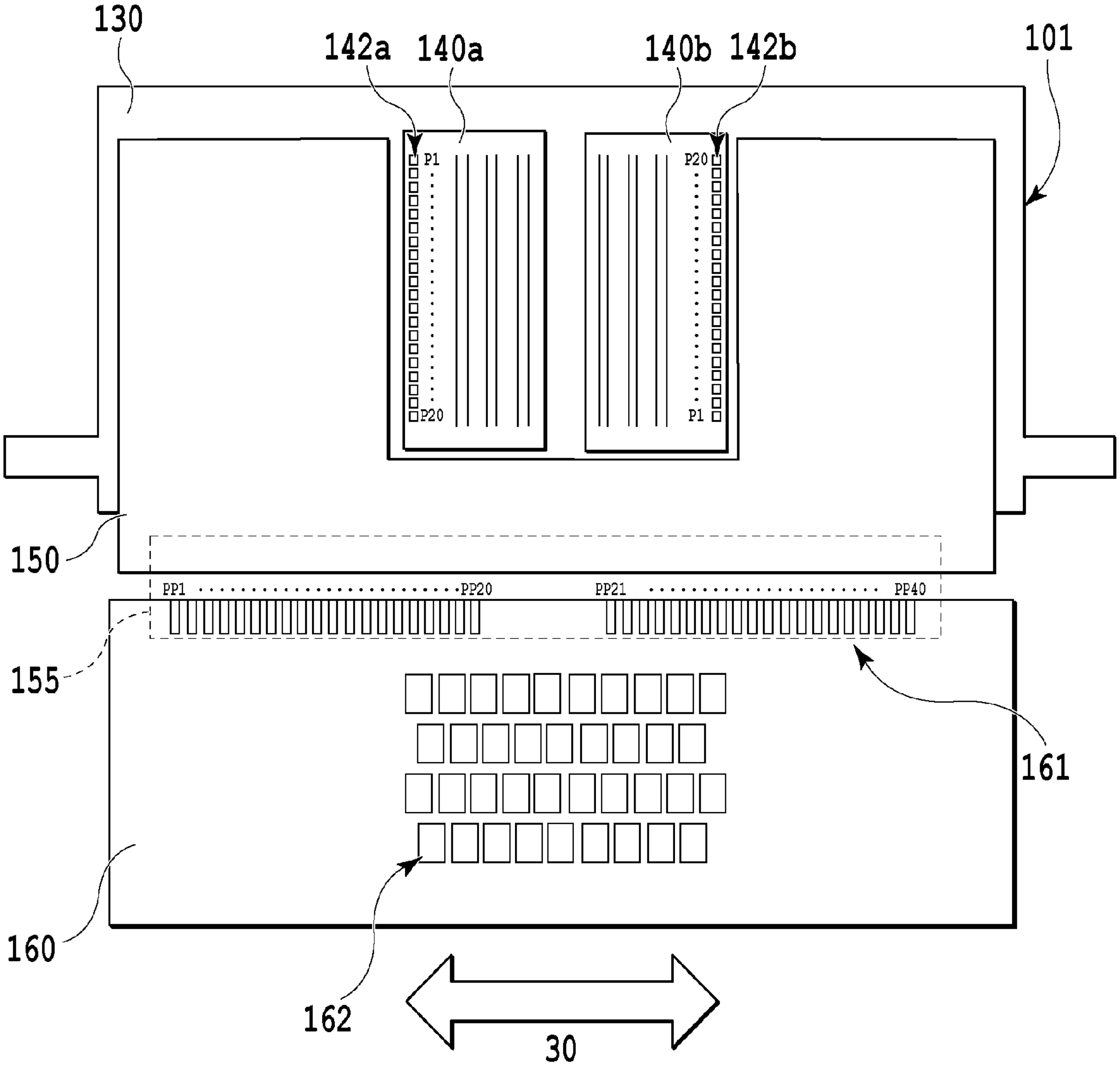
FIG. 3 is an explanatory diagram of a print element substrate unit included in the print head according to one embodiment.

FIG. 3 is an explanatory diagram of the first print element substrate unit 101 according to the present embodiment. It should be noted that for convenience of description, the bottom surface portion and the back surface portion of the first print head 100 are illustrated on the same plane in this figure. An arrow 30 in the figure indicates a direction in which the first print head 100 (see FIG. 2A) moves during liquid ejection (that is, the X direction).

As shown in FIG. 3, the electric substrate 160 includes a body connection portion 162 that is electrically connected to the contact pad of the carriage 15 and receives an electric signal sent from the printing apparatus body and a substrate connection portion 161 for electrical connection with the connection substrate 150.

The electric substrate 160 can send an ejection signal sent from the printing apparatus body to the connection substrate 150 while being mounted in the print apparatus 10 (see FIG. 1). A plurality of terminal rows are arranged in the X direction in the substrate connection portion 161. There are drawn here terminals PP1 to PP40 as examples of terminals arranged in the substrate connection portion 161. The electric substrate 160 and the connection substrate 150 are electrically connected in an electric connection area 155 extending across the electric substrate 160 and the connection substrate 150. In the electric connection area 155, the terminals PP1 to PP40 and the connection substrate 150 are electrically connected.

The connection substrate 150 is electrically connected to the first print element substrate 140*a* and the second print element substrate 140*b*. In the present embodiment, the connection substrate 150 is one connection substrate that connects with a first terminal row 1421*a* in the first print element substrate 140*a* and with a second terminal row 1421*b* in the second print element substrate 140*b* symmetrically from outside in the first direction.

A plurality of terminals are arrayed in the Y direction in the first electric connection portion 142*a* in the first print element substrate 140*a*. In the first electric connection portion 142*a*, the terminals P1 to P20 are arranged from the +Y direction toward the −Y direction. The connection substrate 150 is electrically connected to the terminals P1 to P20 arranged in the first electric connection portion 142*a*.

On the other hand, in the second print element substrate 140*b*, a second electric connection portion 142*b* electrically connected to the connection substrate 150 is arranged. In the second electric connection portion 142*b*, a plurality of terminals are arrayed in the Y direction. In the second electric connection portion 142*b*, the terminals P1 to P20 are arranged from the −Y direction toward the +Y direction. The connection substrate 150 is electrically connected to the terminals P1 to P20 arranged in the second electric connection portion 142*b*.

According to such a configuration, in a case where an electric signal is sent from the printing apparatus body to the electric substrate 160, the electric signal can be sent from the electric substrate 160 to the print element substrate 140 via the connection substrate 150.

[Print Element Substrate 140]

Figure 4:
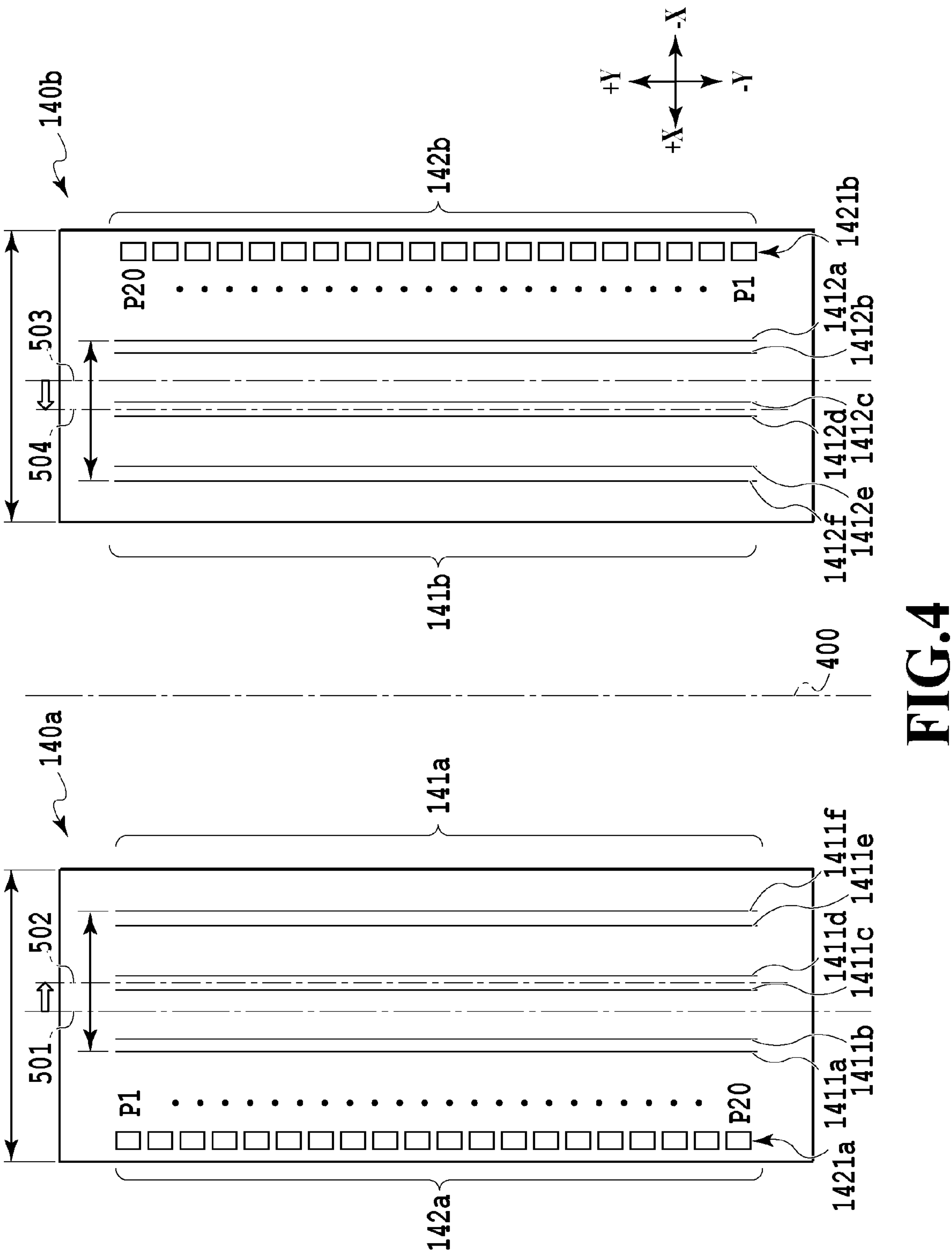
FIG. 4 is a diagram showing a state where a first print element substrate and a second print element substrate are arrayed in a support member according to one embodiment.

FIG. 4 is a diagram showing a state where the first print element substrate 140*a* and the second print element substrate 140*b* are arranged in parallel in the support member 130 according to the present embodiment. That is, in this figure, there is shown a state where the first print element substrate 140*a* and the second print element substrate 140*b* are mounted in the printing apparatus 10 (see FIG. 1).

Further, the first liquid ejection portion 141*a* includes the first electric connection portion 142*a*, an energy generation element, and an ejection element row for three colors. The first electric connection portion 142*a* includes a plurality of terminals. The energy generation elements are electrically connected to respective terminals included in the first electric connection portion 142*a*. The ejection element row (hereinafter also referred to as "the ejection port row") is formed by arraying, in the Y direction in the figure, a plurality of ejection elements, each of which includes an ejection port provided in a position corresponding to the energy generation element.

On the other hand, the second liquid ejection portion 141*b* includes the second electric connection portion 142*b*, an energy generation element, and an ejection element row for three colors. The second electric connection portion 142*b* includes a plurality of terminals. The energy generation elements are electrically connected to respective terminals included in the second electrical connection 142*b*. The ejection element row (that is, the ejection port row) in the second electric connection portion 142*b* is also formed by arraying, in the Y direction in the figure, a plurality of ejection elements, each of which includes an ejection port provided in a position corresponding to the energy generation element.

As examples of a plurality of ejection port rows in the first liquid ejection portion 141*a*, a first ejection port row 1411*a* to a sixth ejection port row 1411*f* are shown. The first and second ejection port rows 1411*a* and 1411 *b* eject the same kind of ink, the third and fourth ejection port rows 1411*c* and 1411*d* eject the same kind of ink, and the fifth and sixth ejection port rows 1411*e* and 1411*f* eject the same kind of ink. In the first electric connection portion 142*a* arranged near a long side of the first print element substrate 140*a*, the terminals P1 to P20 are arrayed in order from the +Y direction toward the −Y direction and form a first terminal row 1421*a*. Thus, it can be said that the first ejection port row 1411*a* to the sixth ejection port row 1411*f* and the first terminal row 1421*a* are arranged so as to extend in the Y direction and be parallel to each other.

On the other hand, in the second liquid ejection portion 141*b*, a plurality of ejection ports for ejecting liquid are arrayed in the longitudinal direction (that is, the Y direction in the figure) of the second print element substrate 140*b*, thereby forming a plurality of ejection port rows. As examples of a plurality of ejection port rows in the second liquid ejection portion 141*b*, a seventh ejection port row 1412*a* to a twelfth ejection port row 1412*f* are shown. The seventh and eighth ejection port rows 1412*a* and 1412*b* eject the same kind of ink, the ninth and tenth ejection port rows 1412*c* and 1412*d* eject the same kind of ink, and the eleventh and twelfth ejection port rows 1412*e* and 1412*f* eject the same kind of ink. In the second electric connection portion 142*b* arranged near the long side of the second print element substrate 140*b*, the terminals P1 to P20 are arrayed in order from the −Y direction toward the +Y direction and form the second terminal row 1421*b*. Thus, it can be said that the seventh ejection port row 1412*a* to the twelfth ejection port row 1412*f* and the second terminal row 1421*b* are arranged so as to extend in the Y direction and be parallel to each other. Incidentally, the number of ejection port rows, the number of terminal rows, and the kind of ink color are determined as necessary and are not limited in the present disclosure.

The first print element substrate 140*a* includes an ejection element row formed by arraying a plurality of ejection elements capable of ejecting ink in accordance with an ejection signal in a second direction (for example, the Y direction) while being mounted in the printing apparatus 10. The first print element substrate 140*a* further includes the first terminal row 1421*a* formed in a first direction (for example, the X direction) by arraying a plurality of terminals for receiving an ejection signal in the second direction. The ejection element row and the first terminal row 1421*a* in the first print element substrate 140*a* are arranged in parallel in the first direction (X direction).

The second print element substrate 140*b* includes an ejection element row formed by arraying a plurality of ejection elements capable of ejecting ink in accordance with an ejection signal in a second direction (for example, the Y direction) while being mounted in the printing apparatus 10. The second print element substrate 140*b* further includes the second terminal row 1421*b* formed in a first direction (for example, the X direction) by arraying a plurality of terminals for receiving an ejection signal in the second direction. The ejection element row and the second terminal row 1421*b* in the second print element substrate 140*b* are arranged in parallel in the first direction (X direction).

The connection substrate 150 is electrically connected to the first terminal row 1421*a* in the first print element substrate 140*a* and the second terminal row 1421*b* in the second print element substrate 140*b*.

The first print element substrate 140*a* and the second print element substrate 140*b* are arranged in the first direction so that each terminal row (the first terminal row 1421*a* and the second terminal row 1421*b*) is located outside and each ejection element row is located inside. Specifically, a plurality of ejection element rows are formed in the first direction in the first print element substrate 140*a* and the second print element substrate 140*b*. Each terminal row in the first print element substrate 140*a* and the second print element substrate 140*b* is arranged at an end portion in the first direction away from a plurality of ejection port rows.

The first print element substrate 140*a* and the second print element substrate 140*b* have the same configuration. The terminal rows in the first print element substrate 140*a* and the second print element substrate 140*b* are arranged symmetrically in the first direction, and the ejection element rows in the first print element substrate 140*a* and the second print element substrate 140*b* are arranged symmetrically in the first direction. For example, the first print element substrate 140*a* and the second print element substrate 140*b* are arranged symmetrically with respect to a hypothetical center line 400 drawn in the second direction at a midpoint between the first print element substrate 140*a* and the second print element substrate 140*b*. The first terminal row 1421*a* and the second terminal row 1421*b* are also arranged symmetrically with respect to the hypothetical center line 400. Similarly, the first ejection port row 1411*a* to the sixth ejection port row 1411*f* and the seventh ejection port row 1412*a* to the twelfth ejection port row 1412*f* are arranged symmetrically with respect to the hypothetical center line 400.

In other words, it can be said that in a planar view, the first print element substrate 140*a* and the second print element substrate 140*b* are arranged symmetrically with respect to an intersection point at which hypothetical lines connecting the corners of long sides facing each other intersect.

As described above, the first print element substrate 140*a* and the second print element substrate 140*b* have the same configuration. That is, the print element substrates 140 manufactured by the same manufacturing process can be used as the first print element substrate 140*a* and the second print element substrate 140*b*.

Further, in the first print element substrate 140*a*, the position of a hypothetical center line 502 in the X direction in the first liquid ejection portion 141*a* is more distant from the first electric connection portion 142*a* in the X direction than the position of a hypothetical center line 501 in the X direction in the first print element substrate 140*a*.

On the other hand, in the second print element substrate 140*b*, the position of a hypothetical center line 504 in the X direction in the second liquid ejection portion 141*b* is more distant from the second electric connection portion 142*a* in the X direction than the position of a hypothetical center line 503 in the X direction in the second print element substrate 140*b*.

In the first print element substrate unit 101, the first print element substrate 140*a* and the second print element substrate 140*b* are arranged symmetrically to each other in a posture such that the first electric connection portion 142*a* and the second electric connection portion 142*b* are located outside. Thus, the first terminal row 1421*a* in the first print element substrate 140*a* and the second terminal row 1421*b* in the second print element substrate 140*b* are also arranged away from each other in the X direction. That is, it can be said that the first print element substrate 140*a* and the second print element substrate 140*b* are arranged so that the electric connection portions 142 of the two are away from each other in the X direction and the ejection port rows of the two are close to each other in the X direction.

According to such a configuration, in a case where the first electric connection portion 142*a* and the second electric connection portion 142*b* are arranged away from each other in the X direction, the liquid ejection portions of the two can be brought closer to each other in the X direction.

Here, it is assumed that the first print element substrate 140*a* and the second print element substrate 140*b* are arranged in parallel in the X direction in the same orientation. In this case, wiring connected to the second print element substrate 140*b* exists between the first print element substrate 140*a* and the second print element substrate 140*b*. Thus, in order to avoid mutual electrical interference between the first print element substrate 140*a* and the second print element substrate 140*b*, the first print element substrate 140*a* and the second print element substrate 140*b* must be arranged in parallel at some distance from each other. Accordingly, in a case where the first print element substrate 140*a* and the second print element substrate 140*b* are arranged in parallel at some distance from each other in the X direction, the first print head 100 described above is also upsized in the X direction.

[Conclusion]

As described above, in the present embodiment, two adjacent print element substrates are arranged in parallel so as to be symmetric in a posture such that the electric connection portions of the two are located outside. Such a configuration makes it possible to suppress the print head from being upsized in the X direction. Thus, the technique according to the present disclosure makes it possible to provide a downsized print head in which a plurality of print element substrates are arranged in parallel in a serial type printing apparatus.

Second Embodiment

A second embodiment in the technique according to the present disclosure will be described below with reference to the drawings. In the following description, descriptions of configurations similar to or corresponding to those in the first embodiment will be omitted as appropriate by using the same reference numerals and names, and differences will be mainly described. The present embodiment is different from the first embodiment in that two connection substrates are arranged and that two electric substrates are arranged. Further, the object of the present embodiment is to provide a print head with increased productivity as compared with the prior art.

[Second Print Head 200]

Figure 5:
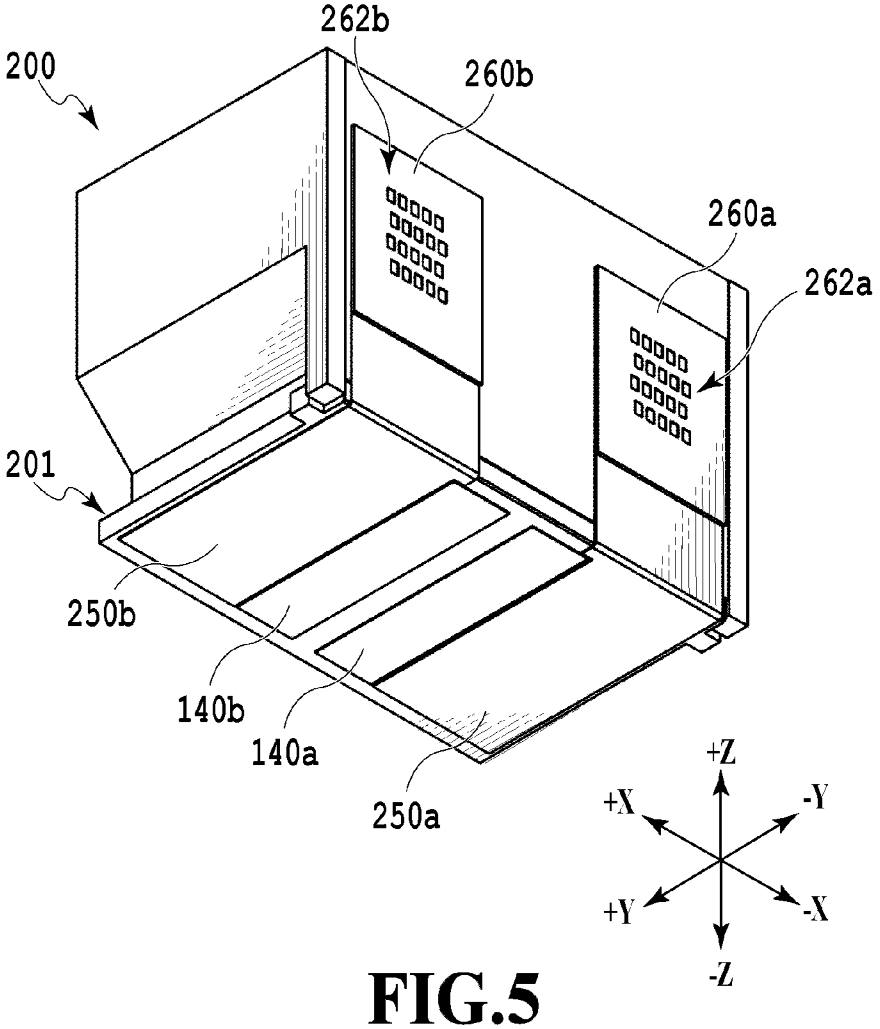
FIG. 5 is a perspective view of the print head as viewed from a bottom surface side according to one embodiment.

FIG. 5 is a perspective view of a second print head 200 as viewed from the bottom surface side according to the second embodiment.

As shown in FIG. 5, the second print head 200 according to the present embodiment includes a second print element substrate unit 201. The second print element substrate unit 201 includes a first connection substrate 250*a*, a second connection substrate 250*b*, a first electric substrate 260*a*, and a second electric substrate 260*b*. Hereinafter, each of the first connection substrate 250*a* and the second connection substrate 250*b* will be referred to as a connection substrate 250 in a case where there is no particular need to distinguish between the two. Each of the first electric substrate 260*a* and the second electric substrate 260*b* will be referred to as an electric substrate 260 in a case where there is no particular need to distinguish between the two.

As illustrated in the figure, in the present embodiment, the first electric substrate 260*a* and the second electric substrate 260*b* are arranged on the back surface side of the second print head 200. Accordingly, the connection substrate 250 electrically connected to the print element substrate 140 is electrically connected to the electric substrate 260 while being bent from the bottom surface side to the back surface side of the second print head 200.

Figure 6:
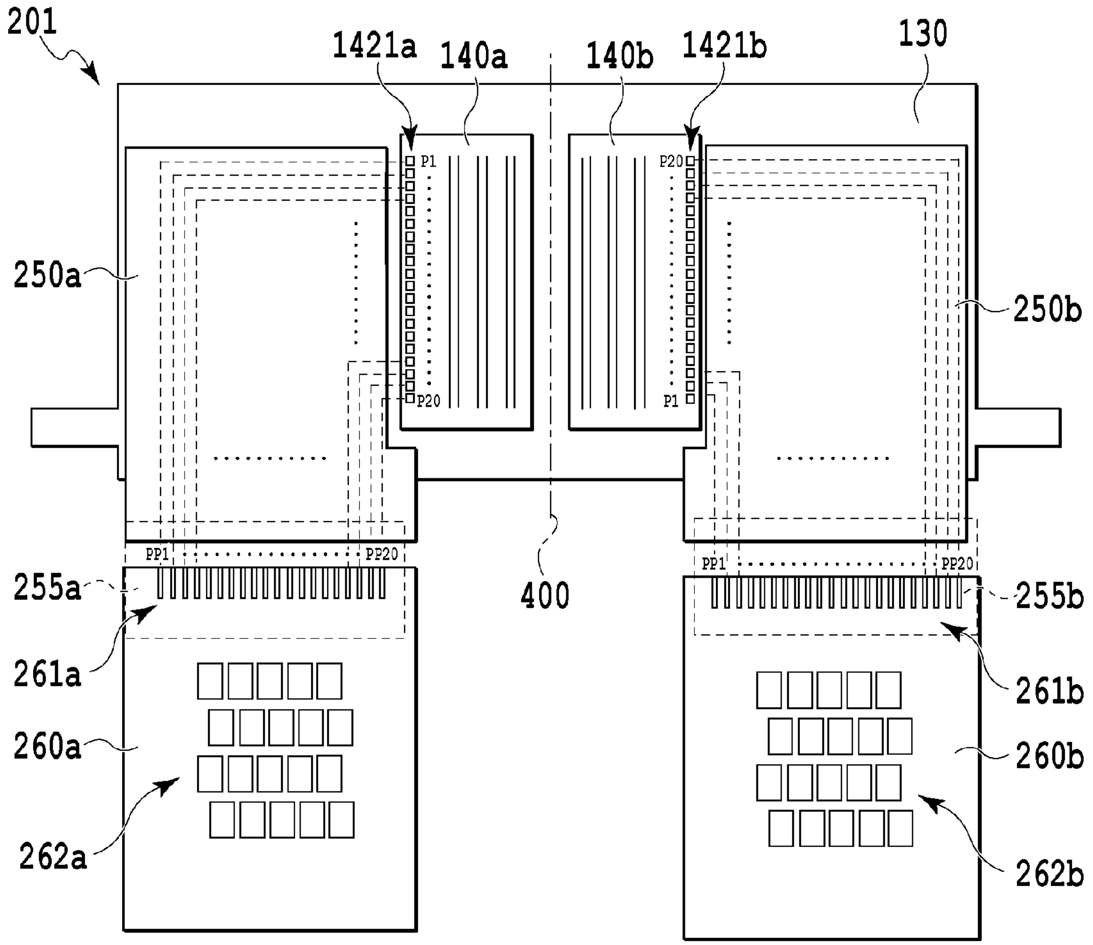
FIG. 6 is an explanatory diagram of a print element substrate unit according to one embodiment.

FIG. 6 is an explanatory diagram of the second print element substrate unit 201 according to the present embodiment.

As shown in FIG. 6, the connection substrate according to the present embodiment includes the first connection substrate 250*a* and the second connection substrate 250*b*. The first connection substrate 250*a* is electrically connected to the first terminal row 1421*a* in the first print element substrate 140*a*. The second connection substrate 250*b* is electrically connected to the second terminal row 1421*b* in the second print element substrate 140*b*. The first connection substrate 250*a* and the second connection substrate 250*b* are arranged symmetrically in the first direction.

Further, the electric substrate according to the present embodiment includes a first electric substrate 260*a* and a second electric substrate 260*b*. The first electric substrate 260*a* can send an ejection signal sent from the printing apparatus body to the first connection substrate 250*a* while being mounted in the printing apparatus 10 described above. The second electric substrate 260*b* can send an ejection signal sent from the printing apparatus body to the second connection substrate 250*b* while being mounted in the printing apparatus 10 described above.

The first connection substrate 250*a* is a connection substrate connected to the terminals PP1 to PP20 of the first electric substrate 260*a* in the anti-gravity direction in a first electric connection area 255*a*. The first electric substrate 260*a* includes a first substrate connection portion 261*a* for electrical connection with the first connection substrate 250*a* and a first body connection portion 262*a* that is electrically connected to the contact pad of the carriage 15 and receives a sent electric signal.

On the other hand, the second connection substrate 250*b* is a connection substrate connected to the terminals PP1 to PP20 of the second electric substrate 260*b* in the anti-gravity direction in a second electric connection area 255*b*. The second electric substrate 260*b* includes a second substrate connection portion 261*b* for electrical connection with the second connection substrate 250*b* and a second body connection portion 262*b* that is electrically connected to the contact pad of the carriage 15 and receives a sent electric signal.

According to such a configuration, an array with the terminals PP1 to PP20 in the first electric connection area 255*a* is the same as an array with the terminals PP1 to PP20 in the second electric connection area 255*b*. Thus, the first electric substrate 260*a* and the second electric substrate 260*b* can have the same configuration. That is, the electric substrates 260 manufactured by the same manufacturing process can be used as the first electric substrate 260*a* and the second electric substrate 260*b*.

Accordingly, for example, it is also possible to use the same electric substrate 260 to produce, for example, a print head having a small number of colors and using only one print element substrate 140. That is, the second print head 200 can be said to be formed using the highly versatile electric substrate 260. Thus, using the electric substrate according to the present embodiment makes it possible to increase the productivity of the print head as compared with the prior art.

Third Embodiment

A third embodiment in the technique according to the present disclosure will be described below with reference to the drawings. In the following description, descriptions of configurations similar to or corresponding to those in the first embodiment or the second embodiment will be omitted as appropriate by using the same reference numerals and names, and differences will be mainly described. The present embodiment is different from the second embodiment in that two electric substrates are arranged on opposing side surface portions of the print head. Further, the object of the present embodiment is to provide a smaller print head in which a plurality of print element substrates are arranged in parallel in a serial type printing apparatus.

[Third Print Head 300]

Figure 7:
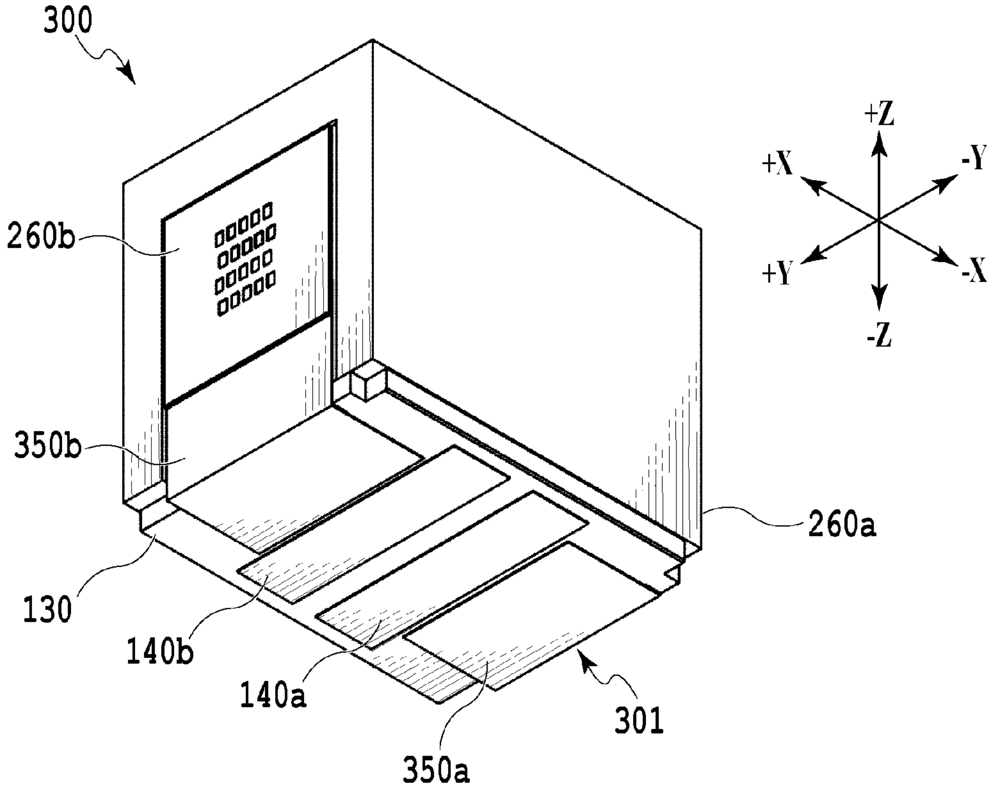
FIG. 7 is a perspective view of the print head as viewed from the bottom surface side according to one embodiment.

FIG. 7 is a perspective view of a third print head 300 as viewed from the bottom surface side according to the third embodiment.

As shown in FIG. 7, the third print head 300 includes a third print element substrate unit 301. The third print element substrate unit 301 includes a third connection substrate 350*a* and a fourth connection substrate 350*b*. Hereinafter, each of the third connection substrate 350*a* and the fourth connection substrate 350*b* will be referred to as a connection substrate 350 in a case where there is no particular need to distinguish between the two.

The first electric substrate 260*a* of the third print head 300 is arranged on the side surface portion facing in the −X direction of the third print head 300. On the other hand, the second electric substrate 260*b* is arranged on the side surface portion facing in the +X direction of the third print head 300. That is, it can be said that the first electric substrate 260*a* is arranged on the first side surface portion in the third print head 300 and that the second electric substrate 260*b* is arranged on the second side surface portion facing in a direction opposite to the first side surface portion.

The third connection substrate 350*a* extends from the first print element substrate 140*a* to the outside of the support member 130 in the −X direction and then extends in the +Z direction, thereby electrically connecting the first print element substrate 140*a* with the first electric substrate 260*a*. The fourth connection substrate 350*b* extends from the second print element substrate 140*b* to the outside of the support member 130 in the +X direction and then extends in the +Z direction, thereby electrically connecting the second print element substrate 140*b* with the second electric substrate 260*b*.

Figure 8:
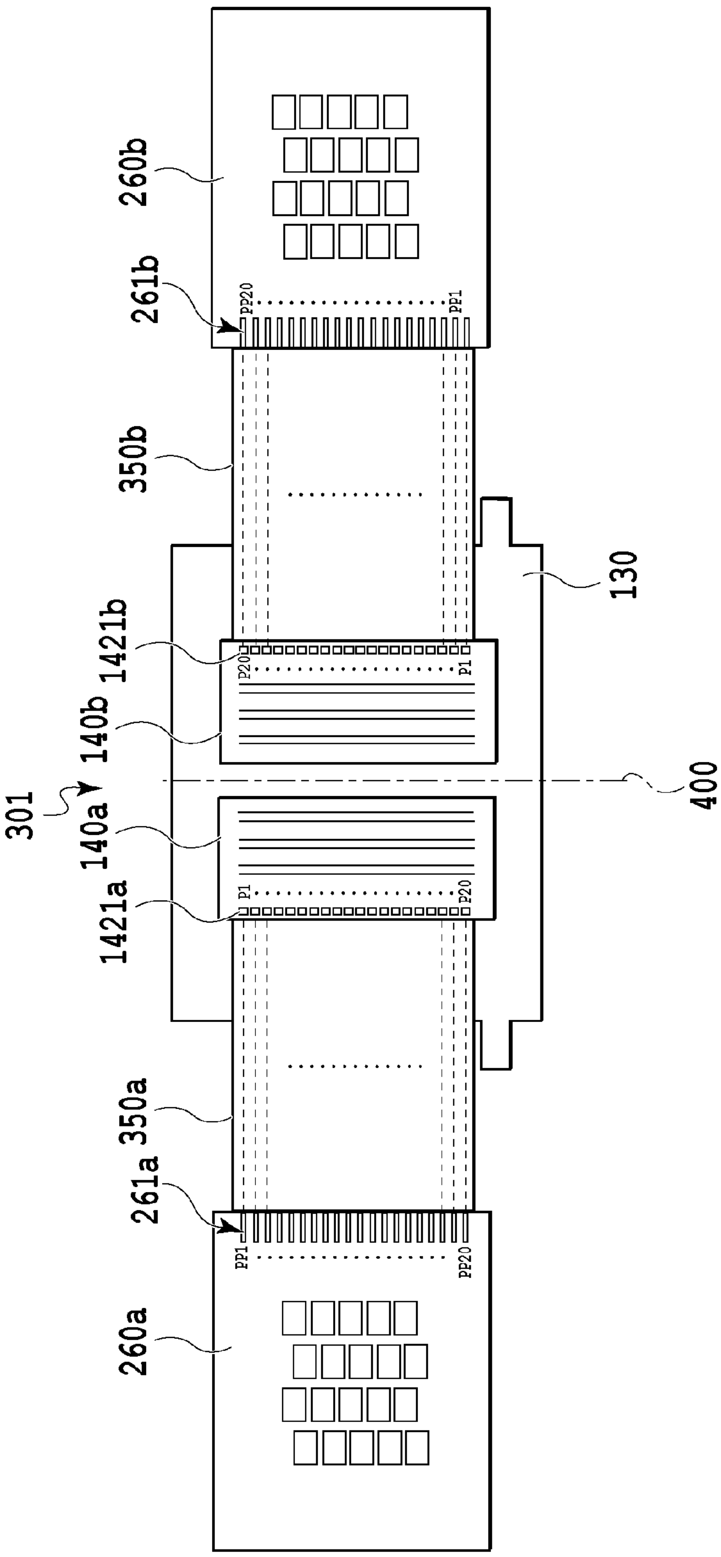
FIG. 8 is an explanatory diagram of the print element substrate unit according to one embodiment.

FIG. 8 is an explanatory diagram of the third print element substrate unit 301 according to the present embodiment. It should be noted that for convenience of description, the bottom surface portion and the side surface portion of the third print head 300 are illustrated on the same plane in this figure.

As shown in FIG. 8, the first print element substrate 140*a* and the second print element substrate 140*b* are arranged in the X direction so that each terminal row is located outside, that the terminal rows are arranged symmetrically, and that the ejection element rows are arranged symmetrically. That is, the first terminal row 1421*a* and the second terminal row 1421*b* are located outside the first liquid ejection portion 141*a* and the second liquid ejection portion 141*b* described above. Further, the first terminal row 1421*a* and the second terminal row 1421*b* are arranged symmetrically and the ejection element row in the first print element substrate 140*a* and the ejection element row in the second print element substrate 140*b* are arranged symmetrically.

Further, the substrate connection portions (the first substrate connection portion 261*a* and the second substrate connection portion 261*b*) in the first electric substrate 260*a* and the second electric substrate 260*b* are located inside in the X direction. The first substrate connection portion 261*a* in the first electric substrate 260*a* is arranged so as to be parallel to the first terminal row 1421*a* in the first print element substrate 140*a*. Furthermore, the second substrate connection portion 261*b* in the second electric substrate 260*b* is arranged so as to be parallel to the second terminal row 1421*b* in the second print element substrate 140*b*.

The first print element substrate 140*a* and the first electric substrate 260*a* are electrically connected by the first connection substrate 250*a* extending in a direction away from the direction in which the second connection substrate 250*b* extends from the first electric connection portion 142*a*. On the other hand, the second print element substrate 140*b* and the second electric substrate 260*b* are electrically connected by the second connection substrate 250*b* extending in a direction away from the direction in which the first connection substrate 250*a* extends from the second electric connection portion 142*b*.

Such a configuration according to the present embodiment makes it possible to reduce a width (a length in the X direction) required to arrange the connection substrate 350 in the support member 130 as compared with the first embodiment and the second embodiment. For example, in the first embodiment and the second embodiment, the connection substrate extends in the Y direction on the support member. In the first place, a length required for the electric connection area of the connection substrate varies depending on the number of wiring lines electrically connected to the terminals of the connection substrate. In a case where the electric substrate is arranged on the back surface portion of the print head, there emerges a need to expand the support member 130 outward in the X direction from the print element substrate.

On the other hand, according to such a configuration according to the present embodiment, since an area required as the electric connection area of the connection substrate 350 extends in the Y direction in the support member 130, there is no need to expand the support member 130 in the X direction. That is, such a configuration makes it possible to reduce not only a distance between the ejection port rows in the two adjacent print element substrates but also the length in the X direction of the print head as compared with the first embodiment and the second embodiment. Thus, the configuration according to the present embodiment makes it possible to provide a smaller print head in which a plurality of print element substrates are arranged in parallel in a serial type printing apparatus.

Fourth Embodiment

In recent years, print heads with a circulation mechanism for collecting, via a support member, liquid that has not been ejected from an ejection port have been developed. Using a print head capable of circulating liquid makes it possible to suppress an increase in the viscosity of the liquid due to the evaporation of water from the ejection port or the like which causes a decrease in liquid droplet ejection speed, the modulation of the density of a coloring material, or the like.

A fourth embodiment in the technique according to the present disclosure will be described below with reference to the drawings. In the following description, descriptions of configurations similar to or corresponding to those in the first to third embodiments will be omitted as appropriate by using the same reference numerals and names, and differences will be mainly described. The present embodiment is different from the first to third embodiments in that the print head according to the present embodiment includes a collecting channel formed to collect liquid that has not been ejected. Further, the object of the present embodiment is to provide a print head that is downsized as compared with the prior art and in which temperature unevenness is suppressed. The following description will be given on the assumption that the print head according to the present embodiment includes a circulation mechanism.

[Liquid Circulation]

Figure 9:
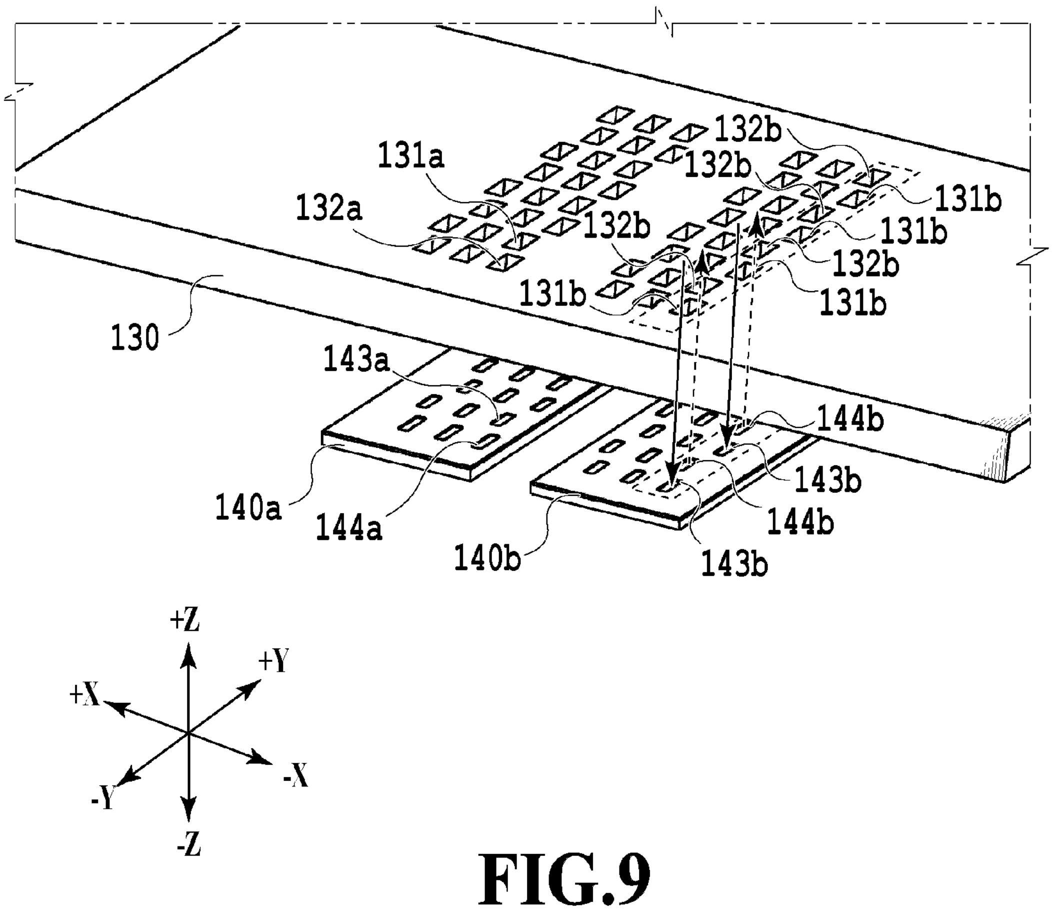
FIG. 9 is a diagram showing an example of liquid circulation.

FIG. 9 is a diagram showing an example of liquid circulation.

As shown in FIG. 9, in the first print element substrate 140*a*, there are formed a first supply opening 143*a* through which liquid flows in the case of ejecting the liquid and a first collecting opening 144*a* through which liquid flows in the case of collecting the liquid that has not been ejected. In the second print element substrate 140*b*, there are formed a second supply opening 143*b* through which liquid flows in the case of ejecting the liquid and a second collecting opening 144*b* through which liquid flows in the case of collecting the liquid that has not been ejected. The first supply opening 143*a*, the first collecting opening 144*a*, the second supply opening 143*b*, and the second collecting opening 144*b* are arranged for three colors in each print element substrate 140. Hereinafter, each of the first supply opening 143*a* and the second supply opening 143*b* will be referred to as a supply opening 143 in a case where there is no particular need to distinguish between the two. Similarly, each of the first collecting opening 144*a* and the second collecting opening 144*b* will be referred to as a collecting opening 144 in a case where there is no particular need to distinguish between the two.

In the support member 130, a first supply channel 131*a* communicating with the first supply opening 143*a* and a first collecting channel 132*a* communicating with the first collecting opening 144*a* are formed while being bonded to the first print element substrate 140*a* and the second print element substrate 140*b*.

In the support member 130, a second supply channel 131*b* communicating with the second supply opening 143*b* and a second collecting channel 132*b* communicating with the second collecting opening 144*b* are formed while being bonded to the first print element substrate 140*a* and the second print element substrate 140*b*. Hereinafter, each of the first supply channel 131*a* and the second supply channel 131*b* will be referred to as a supply channel 131 in a case where there is no particular need to distinguish between the two. Similarly, each of the first collecting channel 132*a* and the second collecting channel 132*b* will be referred to as a collecting channel 132 in a case where there is no particular need to distinguish between the two.

A description will be given here of a liquid flow in the case of ejecting liquid. There is given here one example in which liquid flows through the second supply channel 131*b*, is supplied to the second printing element substrate 140*b*, flows from the second printing element substrate 140*b* through the second collecting channel 132*b*, and is collected.

As indicated by solid line arrows in the figure, in the case of ejecting liquid, the liquid flows into the second supply channel 131*b* of the support member 130. The liquid is then supplied from the second supply channel 131*b* to the second supply opening 143*b* in the second print element substrate 140*b*. The liquid supplied to the second supply opening 143*b* is ejected from an ejection port formed in the second print element substrate 140*b*. However, there is also a case where not all of the liquid supplied to the second supply opening 143*b* is ejected from the ejection port. In this case, the liquid that has not been ejected is collected.

As indicated by dashed arrows in the figure, in the case of collecting liquid, the liquid that has not been ejected from the ejection port of the second print element substrate 140*b* flows into the second collecting channel 132*b* in the support member 130 from the second collecting opening 144*b* of the second print element substrate 140*b*. The liquid is then collected from the support member 130. Incidentally, the collected liquid flows through the second supply channel 131*b* again and is ejected from the ejection port of the second print element substrate 140*b*. That is, the liquid circulates. Circulating liquid in this way makes it possible to collect the liquid thickened due to moisture evaporation or the like and eject the liquid from the ejection port again.

Figure 10:
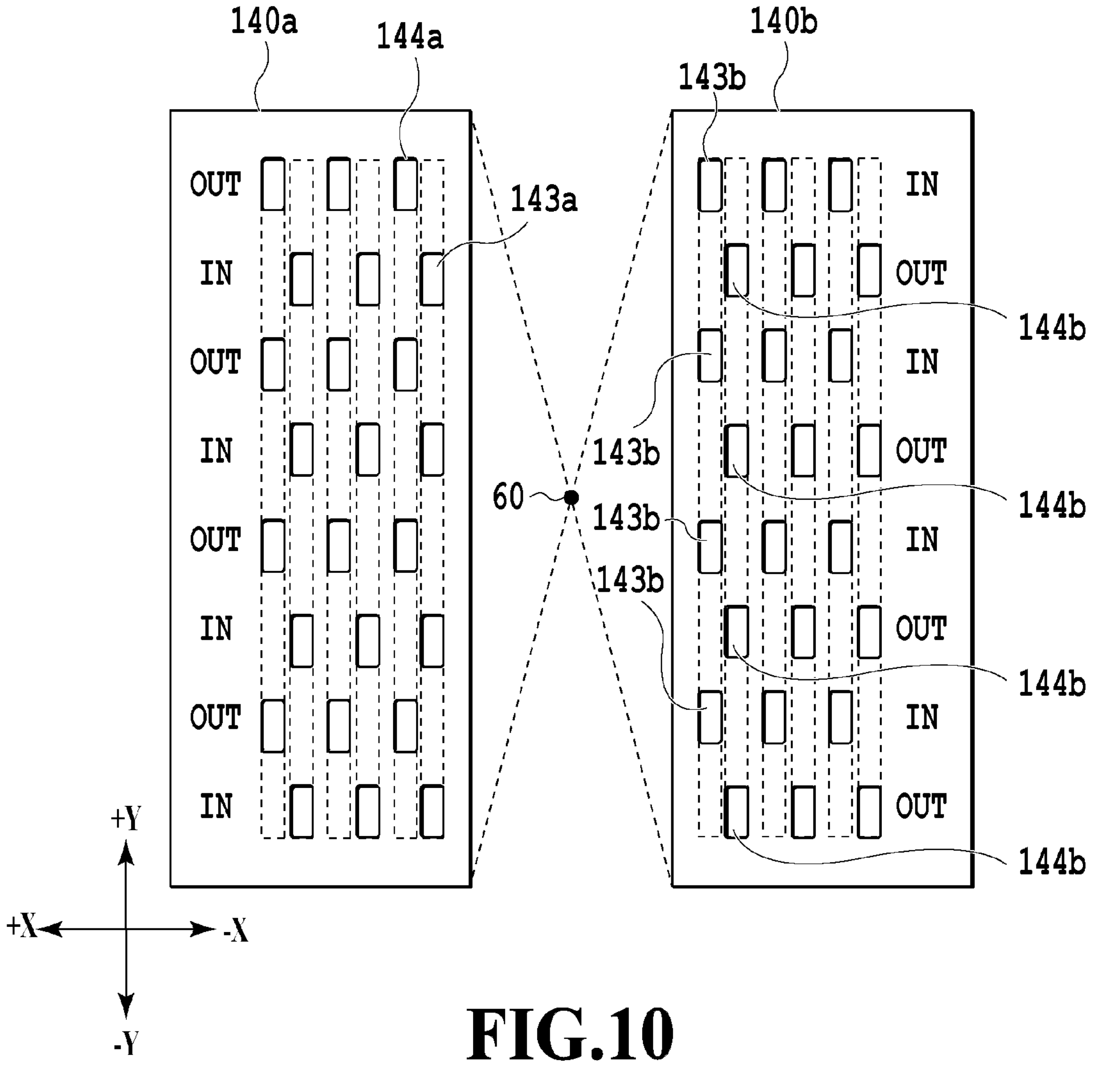
FIG. 10 is a diagram showing an example of a bonding surface of the print element substrate which bonding surface is to be bonded to a support member according to one embodiment.

FIG. 10 is a diagram showing an example of a bonding surface which is bonded to the support member 130 in the print element substrate 140 in which collecting openings are formed. As described above, in the case of arranging the two print element substrates 140 having the same structure so as to be symmetric with respect to a point, the supply opening 143 and the collecting opening 144 are also arranged so as to be symmetric with respect to an intersection point 60 as illustrated. For example, in the case of the bottom surface portion of the first print head 100 in a planar view, the first print element substrate 140*a* and the second print element substrate 140*b* are arranged so as to be symmetric with respect to the intersection point 60 at which hypothetical lines connecting corners of long sides facing each other intersect. That is, it can also be said that the second print element substrate 140*b* is arranged by rotating the first print element substrate 140*a* by 180 degrees.

[Suppression of Temperature Unevenness]

Figure 11:
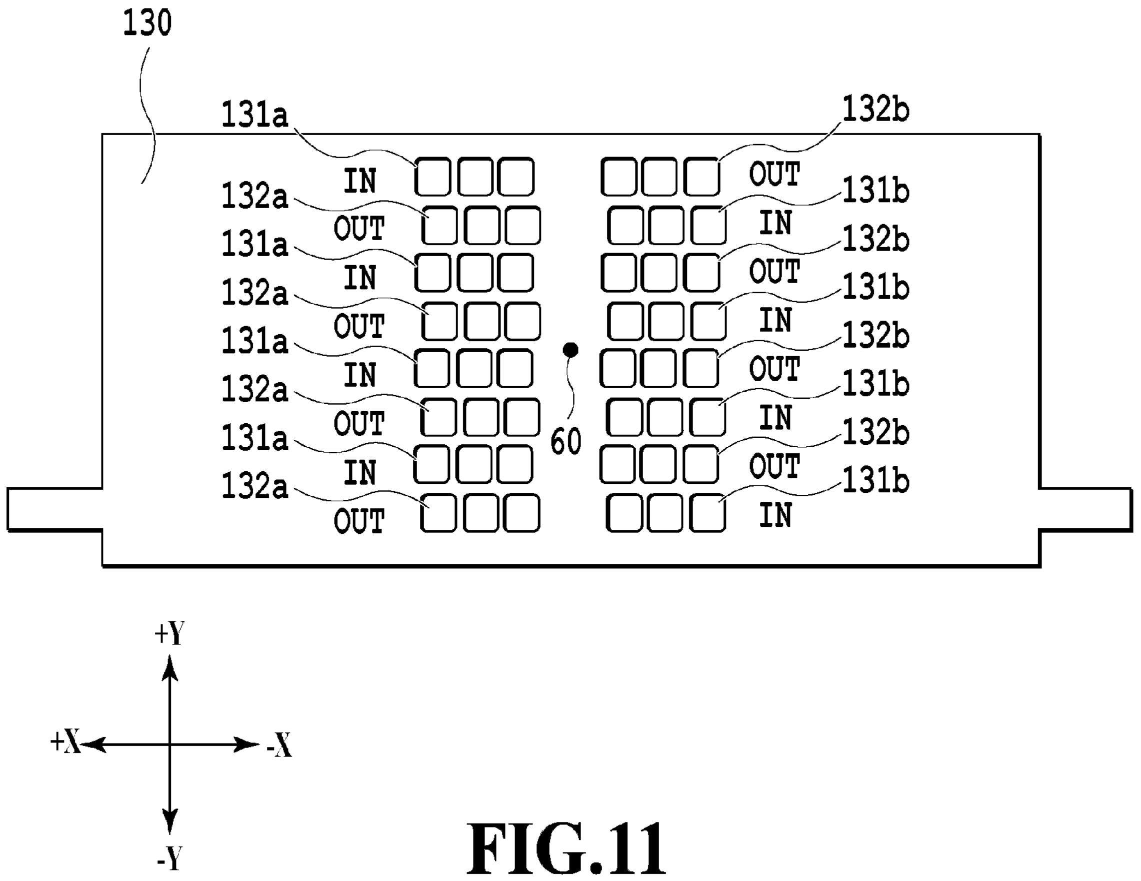
FIG. 11 is a diagram showing an example of a bonding surface of the support member which bonding surface is to be bonded to the print element substrate according to one embodiment.
Figure 12:
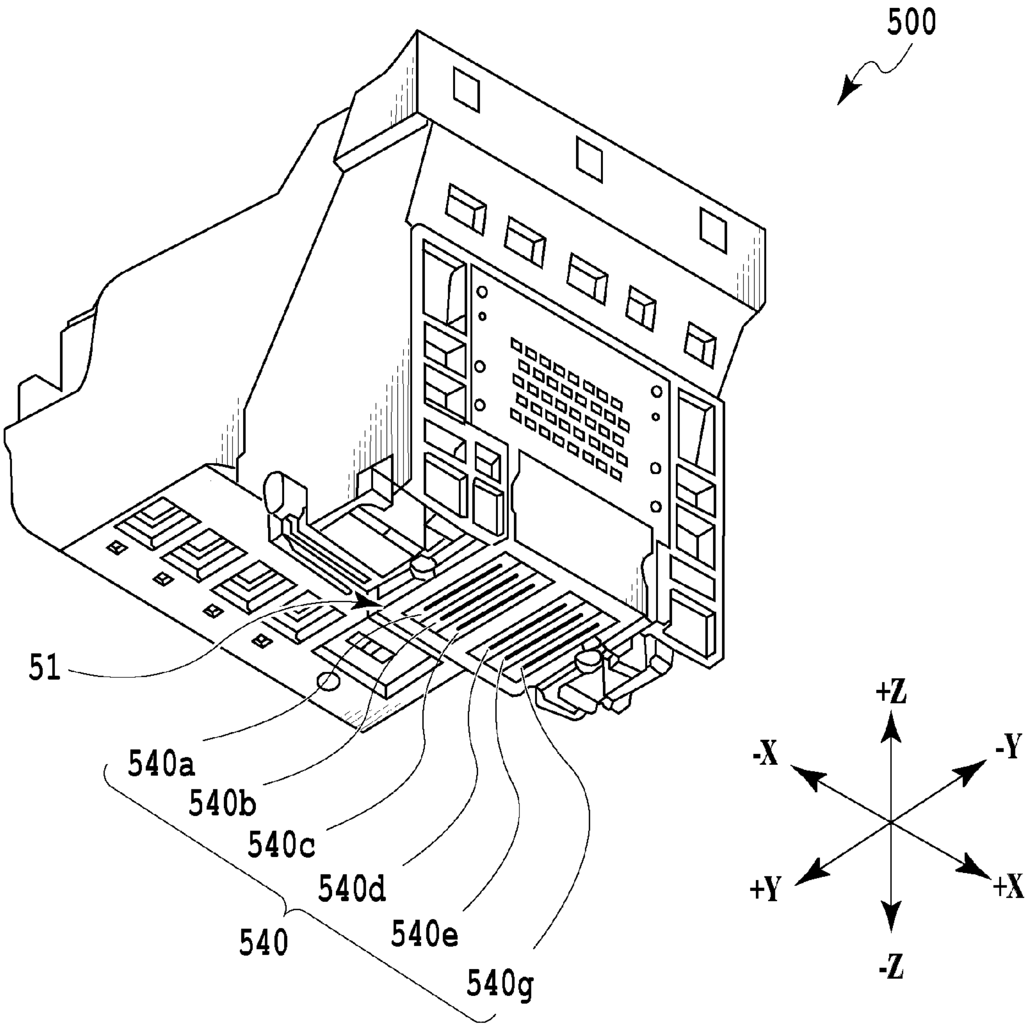
FIG. 12 is a schematic perspective view of the print head according to one comparative example.
Figure 13A:
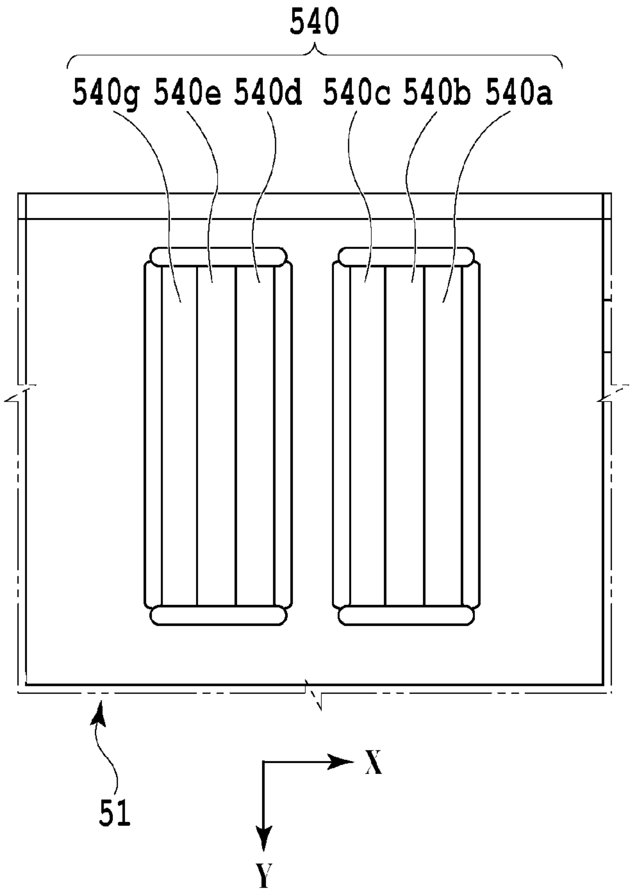
FIGS. 13A and 13B are schematic diagrams of the print element substrate unit according to one comparative example.
Figure 13B:
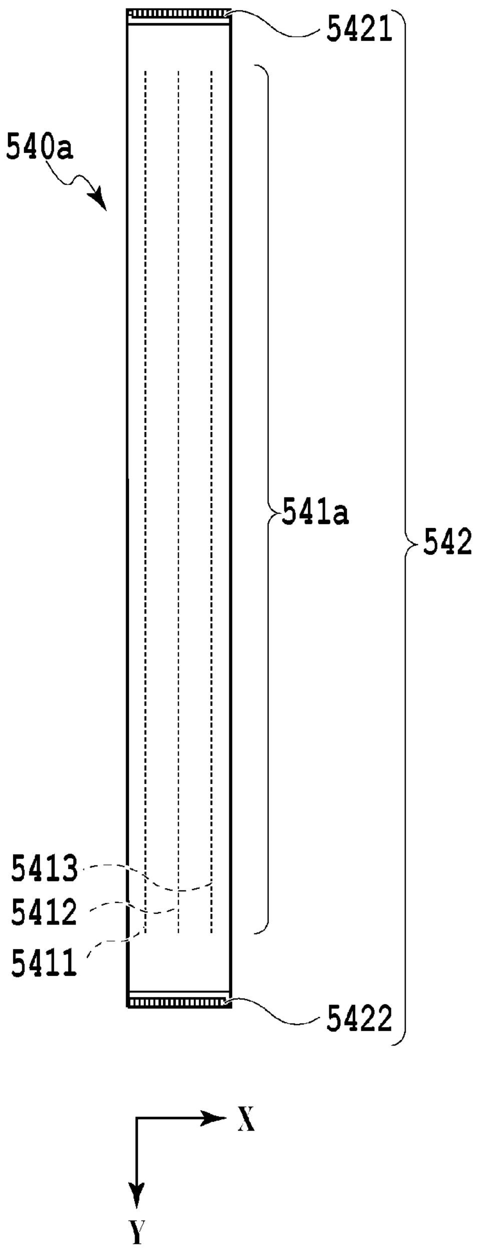
Figure 14:
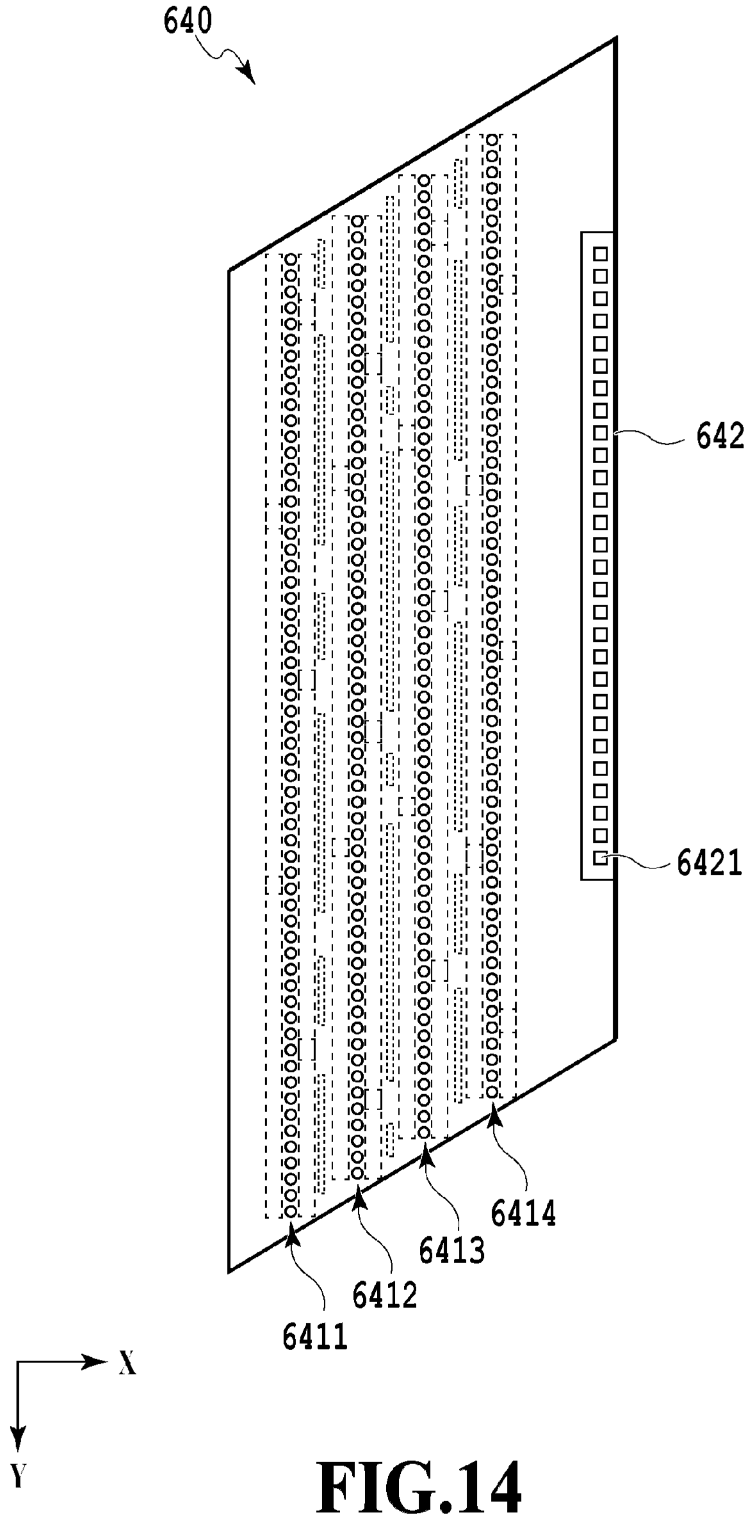
FIG. 14 is a schematic bottom view of the print element substrate used in a line type print head according to one comparative example.

FIG. 11 is a diagram showing an example of bonding surfaces of the support member 130 which bonding surfaces are to be bonded to the print element substrate 140 according to the present embodiment.

As shown in FIG. 11, the supply channel 131 and the collecting channel 132 of the support member 130 are formed so as to correspond to the supply opening 143 and the collecting opening 144 of the print element substrate 140. That is, the first supply channel 131*a* communicating with the supply opening 143 of the first print element substrate 140*a* and the second supply channel 131*b* communicating with the supply opening 143 of the second print element substrate 140*b* are arranged so as to be symmetric with respect to the intersection point 60 as the center of a rotation axis. Similarly, the first collecting channel 132*a* communicating with the collecting opening 144 of the first print element substrate 140*a* and the second collecting channel 132*b* communicating with the collecting opening 144 of the second print element substrate 140*b* are arranged so as to be symmetric with respect to the intersection point 60 as the center of a rotation axis.

Here, a comparison between the temperature of the liquid flowing through the supply channel 131 and the temperature of the liquid flowing through the collecting channel 132 shows that the temperature of the liquid flowing through the collecting channel 132 tends to be higher than that of the liquid flowing through the supply channel 131. This is because, in a case where liquid circulates, the liquid flowing through the collecting channel 132 once has passed through a liquid ejection portion where an ejection element is arranged. For example, in a case where the energy generation element is a heater, the liquid flows through the collecting channel 132 after being heated by the heater. Thus, the temperature of the liquid flowing through the collecting channel 132 tends to be higher than that of the liquid flowing through the supply channel 131. In a case where a plurality of the collecting channels 132 are unevenly formed in the support member 130, there is a possibility that only a portion where the collecting channel 132 is formed may locally have a high temperature. That is, it can be said that there is a possibility that temperature unevenness may occur in the support member 130 and that the liquid cannot be ejected uniformly.

Thus, in the support member 130 according to the present embodiment, the supply channel 131 and the collecting channel 132 are formed so as to be symmetric with respect to the intersection point 60. According to such a configuration, in a case where liquid circulates, it is possible to reduce temperature unevenness in the support member 130. As described above, the arrangement of the print element substrates according to the present embodiment makes it possible to make the print head smaller than in the prior art. Additionally, the temperature unevenness of the print head can be suppressed.

Other Embodiment

The configurations of the first to third embodiments described above can also be combined with each other.

In the first to fourth embodiments, ink is used as an example of liquid. However, the liquid does not have to be ink. For example, various recording liquids including a processing liquid used for the purpose of increasing ink fixability, reducing gloss unevenness, and increasing abrasion resistance on a print medium may be used.

According to the technique according to the present disclosure, it is possible to provide a downsized print head in which a plurality of print element substrates are arranged in parallel in a serial type printing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-129594, filed Aug. 16, 2022, which is hereby incorporated by reference herein in its entirety.

What is claimed is:

1. A print head mountable in a printing apparatus for printing an image on a print medium by repeating a print scanning which is performed by moving the print head in a first direction with respect to the print medium while ejecting ink and a conveyance operation of conveying the print medium in a second direction intersecting the first direction, the print head comprising:

a first print element substrate and a second print element substrate, each having an ejection element row and a terminal row arranged in parallel in the first direction, wherein the ejection element row is formed by arraying in the second direction a plurality of ejection elements capable of ejecting ink in accordance with an ejection signal and the terminal row is formed by arraying in the second direction a plurality of terminals for receiving the ejection signal in a state in which the print head is mounted; and a connection substrate electrically connected to a terminal row in the first print element substrate and a terminal row in the second print element substrate, wherein the first print element substrate and the second print element substrate are arranged in the first direction so that each terminal row is located at an outer side of the first print element substrate and the second print element substrate and each ejection element row is located at an inner side of the first print element substrate and the second print element substrate.

2. The print head according to claim 1, wherein the first print element substrate and the second print element substrate have an identical configuration and are arranged so that the terminal rows are arranged symmetrically in the first direction and the ejection element rows are arranged symmetrically in the first direction.

3. The print head according to claim 1, wherein in a planar view, the first print element substrate and the second print element substrate are arranged so as to be symmetric with respect to an intersection point at which hypothetical lines connecting corners of long sides facing each other intersect.

4. The print head according to claim 1, further comprising:

a support portion configured to support the first print element substrate and the second print element substrate, wherein in the first print element substrate, a first supply opening for supplying liquid to the ejection element and a first collecting opening for collecting liquid that has not been ejected from the ejection element are formed, in the second print element substrate, a second supply opening for supplying liquid to the ejection element and a second collecting opening for collecting liquid that has not been ejected from the ejection element are formed, and in the support portion, with the support unit bonded to the first print element substrate and the second print element substrate, a first supply channel communicating with the first supply opening, a first collecting channel communicating with the first collecting opening, a second supply channel communicating with the second supply opening, and a second collecting channel communicating with the second collecting opening are formed.

5. The print head according to claim 1, wherein in the first print element substrate and the second print element substrate, a plurality of the ejection element rows are formed in the first direction, and each terminal row in the first print element substrate and the second print element substrate is arranged at an end portion in the first direction away from a plurality of ejection port rows.

6. The print head according to claim 1, wherein the connection substrate is a single connection substrate connecting with a terminal row in the first print element substrate and with a terminal row in the second print element substrate symmetrically from outside in the first direction.

7. The print head according to claim 6, further comprising:

an electric substrate capable of sending the ejection signal sent from the printing apparatus to the connection substrate in a state in which the print head is mounted in the printing apparatus.

8. The print head according to claim 1, wherein the connection substrate includes a first connection substrate connected to the terminal row in the first print element substrate and a second connection substrate connected to the terminal row in the second print element substrate, and the first connection substrate and the second connection substrate are arranged symmetrically in the first direction.

9. The print head according to claim 8, wherein the print head comprises a first electric substrate capable of sending the ejection signal sent from the printing apparatus to the first connection substrate in a state in which the print head is mounted in the printing apparatus, and a second electric substrate capable of sending the ejection signal sent from the printing apparatus to the second connection substrate in a state in which the print head is mounted in the printing apparatus, and the first electric substrate and the second electric substrate are arranged symmetrically in the first direction.

10. The print head according to claim 9, wherein the first electric substrate is arranged on a first side surface portion in the print head, and the second electric substrate is arranged on a second side surface portion facing in a direction opposite to the first side surface portion of the print head.

11. A head cartridge comprising:

a print head mountable in a printing apparatus for printing an image on a print medium by repeating print scanning which is performed by moving the print head in a first direction with respect to the print medium while ejecting ink and a conveyance operation of conveying the print medium in a second direction intersecting the first direction, the print head comprising:

a first print element substrate and a second print element substrate in each of which an ejection element row formed by arraying in the second direction a plurality of ejection elements capable of ejecting ink in accordance with an ejection signal in a state in which the print head is mounted in the printing apparatus and a terminal row formed by arraying in the second direction a plurality of terminals for receiving the ejection signal in a state in which the print head is mounted in the printing apparatus are arranged in parallel in the first direction; and a connection substrate electrically connected to a terminal row in the first print element substrate and a terminal row in the second print element substrate, wherein the first print element substrate and the second print element substrate are arranged so that each terminal row is located at an outside in the first direction and each ejection element row is located at an inside in the first direction; and an ink tank configured to contain ink to be supplied to the first print element substrate and the second print element substrate.

12. A printing apparatus comprising:

a print head mountable in a printing apparatus for printing an image on a print medium by repeating print scanning which is performed by moving the print head in a first direction with respect to the print medium while ejecting ink and a conveyance operation of conveying the print medium in a second direction intersecting the first direction, the print head comprising:

a first print element substrate and a second print element substrate in each of which an ejection element row formed by arraying in the second direction a plurality of ejection elements capable of ejecting ink in accordance with an ejection signal in a state in which the print head is mounted in the printing apparatus and a terminal row formed by arraying in the second direction a plurality of terminals for receiving the ejection signal in a state in which the print head is mounted in the printing apparatus are arranged in parallel in the first direction; and a connection substrate electrically connected to a terminal row in the first print element substrate and a terminal row in the second print element substrate, wherein the first print element substrate and the second print element substrate are arranged so that each terminal row is located at an outside in the first direction and each ejection element row is located at an inside in the first direction;

a moving unit configured to move the print head in the first direction; and a conveying unit configured to convey the print medium in the second direction.

* * * * *